(12) United States Patent
Lang et al.

(10) Patent No.: US 11,473,534 B2
(45) Date of Patent: Oct. 18, 2022

(54) SORPTION DEVICE

(71) Applicant: A. Kayser Automotive Systems GmbH, Einbeck (DE)

(72) Inventors: Tobias Lang, Gieboldehausen (DE); Hauke Zywina, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 252 days.

(21) Appl. No.: 16/839,740

(22) Filed: Apr. 3, 2020

(65) Prior Publication Data
US 2020/0316509 A1    Oct. 8, 2020

(30) Foreign Application Priority Data
Apr. 8, 2019    (DE) .......................... 102019002565.2

(51) Int. Cl.
*F02M 25/08*    (2006.01)
*B01D 46/00*    (2022.01)
(Continued)

(52) U.S. Cl.
CPC ..... *F02M 25/0854* (2013.01); *B01D 46/0002* (2013.01); *B01D 46/2403* (2013.01);
(Continued)

(58) Field of Classification Search
CPC ............ B01D 46/0002; B01D 46/2403; B01D 46/0024; B01D 46/0036; B01D 46/2411; B01D 2257/702; B01D 2257/708; B01D 2258/01; B01D 2279/40; B01D 2259/4516; B01D 53/0407; B01D 53/0431; F02M 25/0854
See application file for complete search history.

(56) References Cited

U.S. PATENT DOCUMENTS

| 4,279,630 A | 7/1981 | Nakamura et al. |
| 6,695,896 B2 | 2/2004 | Hara et al. |

(Continued)

FOREIGN PATENT DOCUMENTS

| CN | 1486213 A | 3/2004 |
| CN | 101443545 A | 5/2009 |

(Continued)

*Primary Examiner* — Gabriel E Gitman
(74) *Attorney, Agent, or Firm* — Richard M. Goldberg

(57) ABSTRACT

A sorption device for filtering evaporation emissions from a fuel tank, includes a vessel, with a first opening connected to an air removal path of the fuel tank and a second opening opening to atmosphere, a middle annular space between a radial outer circumferential boundary of the middle annular space and a radial inner circumferential boundary thereof radially inwardly spaced apart from the outer boundary, a first annular space formed between a radial inner surface of a fluid-tight circumferential outer shell of the vessel, the radial outer boundary being radially inwardly spaced from the inner surface, a sorbent material arranged in the middle annular space, and evaporation emissions from the fuel tank are guided through the first opening into the first annular space, through the sorbent material into a central space of the vessel in the radial direction, and through the second opening to atmosphere or another sorption device.

21 Claims, 2 Drawing Sheets

(51) Int. Cl.
*B01D 46/24* (2006.01)
*F01N 3/08* (2006.01)

(52) U.S. Cl.
CPC .... *B01D 2257/702* (2013.01); *B01D 2258/01* (2013.01); *B01D 2279/40* (2013.01); *F01N 3/0807* (2013.01); *F01N 3/0835* (2013.01)

(56) References Cited

U.S. PATENT DOCUMENTS

| | | | |
|---|---|---|---|
| 2003/0226800 A1 | 12/2003 | Brown et al. | |
| 2004/0099253 A1* | 5/2004 | Tschantz | F02M 35/10281 123/518 |
| 2006/0016436 A1* | 1/2006 | Groom | F02M 25/08 123/520 |
| 2006/0266338 A1* | 11/2006 | Kashima | F02M 37/0082 123/519 |
| 2007/0267337 A1 | 11/2007 | Yang | |
| 2008/0251053 A1* | 10/2008 | Shears | F02M 25/0854 123/518 |

FOREIGN PATENT DOCUMENTS

| | | |
|---|---|---|
| CN | 105457401 A | 4/2016 |
| CN | 105498378 A | 4/2016 |
| CN | 105597451 A | 5/2016 |
| CN | 105727637 A | 7/2016 |
| CN | 106256405 A | 12/2016 |
| CN | 106762268 A | 5/2017 |
| CN | 107875765 A | 4/2018 |
| CN | 108709255 A | 10/2018 |
| DE | 102004000048 A1 | 5/2006 |
| DE | 102009033263 A1 | 2/2010 |
| JP | 2001-323847 A | 11/2001 |
| TW | 201429538 A | 8/2014 |

* cited by examiner

SORPTION DEVICE

BACKGROUND OF THE INVENTION

The invention relates to a sorption device and to a sorption system for filtering evaporation emissions from a fuel tank.

The sorption device of this kind and/or the sorption system is usually used to filter substances, in particular harmful substances, out of the evaporation emissions of a fuel tank, the evaporation emissions in particular escaping via an air supply and removal path of the fuel tank. The evaporation emissions to be filtered should flow through the filter such that as much as possible of the substance to be filtered out is sorbed by the sorption device and/or the sorption system. A filtering performance of the sorption device and/or of the sorption system should be as high as possible, for example as much hydrocarbon as possible should be filtered out of the evaporation emissions, in order to minimize or eliminate the environmental impact. Furthermore, the sorption device and/or the sorption system should assist in complying with legal provisions, in particular emission regulations.

SUMMARY OF THE INVENTION

Against this background, an object of the present invention is to provide an improved sorption device and/or an improved sorption system, in particular with an increased sorption rate.

This object is solved by the subject matter of the relevant independent claim.

An aspect relates to a sorption device for filtering evaporation emissions from a fuel tank, comprising a vessel for at least partially filtering evaporation emissions from the fuel tank, it being possible to connect a first opening of the vessel to an air removal path of the fuel tank and a second opening of the vessel opening out into the atmosphere. A middle annular space is arranged in the vessel between a radial outer boundary of the middle annular space that extends all the way around in the circumferential direction and a radial inner boundary thereof that extends all the way around in the circumferential direction and that is radially inwardly spaced apart from said outer boundary. A first annular space is formed between a radial inner surface of a fluid-tight outer shell of the vessel, which outer shell extends all the way around in the circumferential direction, and the radial outer boundary of the middle annular space that is radially inwardly spaced apart therefrom. Moreover, a sorbent, in particular adsorbent, material is arranged in the middle annular space. Evaporation emissions from the fuel tank are guided through the first opening into the first annular space, through the sorbent material into a central space of the vessel in the radial direction, and through the second opening directly or indirectly into the atmosphere or into another sorption device.

An advantage of the present invention is that, by guiding the evaporation emissions through successive spaces of different designs, the substances contained in the evaporation emissions are mixed more thoroughly, the evaporation emissions in particular being homogenized. This prevents areas having a higher concentration of a substance to be filtered out of the evaporation emissions, for example hydrocarbons, which could otherwise only be sorbed in part. Therefore, by means of the configuration according to the invention, a sorption rate can be increased, which, with regard to the substance to be filtered out for example the hydrocarbons contained in the evaporation emissions results in an improved filtering performance of the sorption device and/or of the sorption system.

The sorption device may be a device for at least partially filtering substances and/or particles out of a fluid. The fluid may be a gaseous medium, in particular a mixture of air and gaseous fuel, for example evaporation emissions from a fuel tank. In particular, the sorption device may be part of an activated charcoal canister.

The fuel tank may be a tank or container, for example a canister, for storing fuel and may be stationary or provided in a motor vehicle comprising an internal combustion engine.

The air removal path of the fuel tank may for example be a closed line for guiding the evaporation emissions out of the fuel tank into the atmosphere, it being possible to arrange one or more filter elements and/or sorption devices in the air removal path.

The vessel may contain a plurality of spaces, in particular annular spaces, which serve to guide the evaporation emissions around and/or through. In particular, guide elements such as channels, chambers and/or deflection plates or deflection bodies may be provided for this purpose. A deflection plate may for example be made from metal, plastics material, fiber material or combinations thereof; the term "plate" should simply be understood to mean "sheet-like".

The vessel may have an approximately circle-shaped or polygonal cross-section, for example an elliptical, circular or rectangular cross-section.

The first opening of the vessel may be designed for more simple connection to the air removal by means of a quick coupling, for example a bayonet fitting and/or an engaging means.

The second opening of the vessel may be provided with a removable cover in order to prevent liquid and/or solid foreign matter from entering the vessel. The cover may for example be designed having a removable dust cap, which covers an outlet of the cover to the atmosphere but which allows for a fluid connection between the second opening and the atmosphere.

The radial inner surface of a body may be a surface formed on the inside, in the radial direction, of the body. In particular, the radial inner surface of the, for example, approximately hollow-cylindrical outer shell of the vessel is a surface formed on the inside, in the radial direction, of the outer shell, i.e. more or less the inner lateral surface of the approximately hollow-cylindrical outer shell.

Accordingly, the radial outer surface of a body is a surface formed on the outside, in the radial direction, of the body. In particular, the radial outer surface of a, for example, approximately hollow-cylindrical inner shell of the vessel is a surface formed on the outside, in the radial direction, of the inner shell, i.e. the lateral surface of the approximately hollow-cylindrical inner shell.

The relevant annular space may be designed as an approximately ring-shaped space in the vessel, more or less as an approximately hollow-cylindrical negative shape. The relevant annular space, depending on the desired function thereof for guiding the evaporation emissions around or through, may be delimited at least in portions by a fluid-tight wall or a wall that is permeable at least in parts to the evaporation emissions.

The sorbent material may comprise adsorbent material at least in part. For example, the sorbent material may contain activated carbon, activated charcoal, clay, zeolite, porous polymer, porous alumina, porous silica, titanium dioxide, cerium dioxide and/or combinations thereof. A fluid stream, for example an air stream, may be directed from the second opening of the vessel to the first opening of the vessel in order to clean the sorbent material of caked-on substances, for example.

An axial direction may be a direction in an extension of a length of a component. In the case of a, for example, approximately cylindrical vessel, the axial direction is oriented approximately in parallel with a generatrix or the longitudinal axis of the vessel.

A radial direction may be oriented perpendicularly to the axial direction. In the case of the, for example, approximately cylindrical vessel, the radial direction is oriented so as to coincide with the radius of the approximately cylindrical vessel. In the case of a, for example, hollow-cylindrical sorbent material designed as a molded body, the radial direction extends in the direction of the wall thickness of the approximately hollow-cylindrical sorbent material designed as a molded body.

Accordingly, a circumferential direction may be a direction in an extension of the circumference of the component.

Within the context of the present invention, the terms "outer" and "inner" and the like used in the following should be understood to mean that an, in particular idealized or imaginary, central point is an innermost point. A region external to this is an, in particular idealized or imaginary, circumferential region. A point or region that is referred to as being further out than another point or region is therefore further out in the radial direction from the central point toward the circumferential region than the other point or region.

The sorbent material may be designed as a granular material and/or as a molded body that is permeable to the flow in particular in the radial direction thereof, it being possible for the molded body to be a self-supporting molded body. For example, the molded body may be approximately hollow-cylindrical. The sorbent material may therefore be poured into a cavity and/or received in the vessel in any desired design in solid form. This ensures a high degree of design freedom, in particular when designing the vessel.

The molded body may be axially held, in particular mounted, in the second annular space by means of at least one spacer ring.

Alternatively or additionally, the molded body may consist at least in part of sorbent material.

Advantageously, the sorbent material may be designed at least in part as adsorbent material. Therefore, the sorbent material can be cleaned more easily, in particular of caked-on sorbate, and can be used multiple times, which increases the useful life of the sorbent material and thus the maintenance interval of the sorption device.

Alternatively or additionally, the sorbent material may be designed at least in part as absorbent material. Therefore, the suitable sorbent material can be selected or combined from various sorbent materials depending on the application.

In particular, the radial outer boundary of the middle annular space may be designed as a radial outer surface of the sorbent material designed as a molded body. Moreover, the radial inner boundary of the middle annular space may be designed as a radial inner surface of the sorbent material designed as a molded body.

Alternatively, the radial outer boundary of the middle annular space may be designed as a radial outer surface of a first slotted wall that extends all the way around in the circumferential direction. Moreover, the radial inner boundary of the middle annular space may be designed as a radial inner surface of a second slotted wall that extends all the way around in the circumferential direction, the second slotted wall being radially inwardly spaced apart from the first slotted wall.

By virtue of this configuration, an extension of the middle annular space and/or of the sorbent material designed as a molded body in the radial direction can be handled in a flexible manner, depending on the design.

In particular, a second annular space can be formed between a radial inner surface of the first slotted wall and a radial outer surface of the second slotted wall, it being possible for the sorbent material to be designed as a granular material and/or as a molded body in the second annular space.

The outer boundary and/or the inner boundary of the middle annular space may be physical or imaginary delimitations of the middle annular space. For example, in the case of a sorbent material designed as a granular material, the granular material may be supported by a wall arranged radially outward therefrom and a wall arranged radially inward therefrom, in particular by the slotted walls described above. In contrast, in the case of the sorbent material designed as a self-supporting molded body, supporting walls can be dispensed with entirely, however it is also possible for the molded body to be arranged between supporting walls like the granular material.

Alternatively or additionally, the sorbent material may be designed as a coating of at least one surface on the inside of the vessel. For example, the coating may be formed at least on the radial inner surface of the first slotted wall and/or at least on the radial outer surface of the second slotted wall. In this way, the level of design freedom can be increased even further with regard to the accommodation of the sorbent material. In particular, a surface between the slots may also be coated with the sorbent material.

The slotted wall may be designed as a wall that is permeable at least in parts to the evaporation emissions from the fuel tank, for example as a wall that is porous at least in parts and/or perforated at least in parts. In particular, one or more perforations that may be designed to extend in the axial direction at least in part and/or in the circumferential direction at least in part may be formed as a hole or slot in the slotted wall. For example, a plurality of slots may be formed over an entire circumference of the slotted wall and extend over an entire axial length of the slotted wall. Alternatively, a plurality of slots may be formed over part of the circumference of the slotted wall. As another alternative, a plurality of slots may extend over part of the axial length of the slotted wall. In particular in the case of slots that extend continuously in the circumferential direction, the slots may be interconnected and thus held together by means of connecting webs.

A filter element comprising sorbent material may be arranged in the central space. Therefore, in addition to the sorbent material already provided, a filter element comprising additional sorbent material can also be provided, as a result of which the filtering performance of the sorption device can be further increased.

In other words, a filter element comprising sorbent material may be arranged downstream of the sorbent material, viewed in the direction of flow of the evaporation emissions from the fuel tank. Alternatively or additionally, a filter element comprising sorbent material may be arranged upstream of the sorbent material, viewed in the direction of flow of the evaporation emissions from the fuel tank.

In particular, the evaporation emissions from the fuel tank may be guided along the filter element and/or through the filter element to the second opening of the vessel. In particular, more of the above-mentioned guide elements may be provided for this purpose.

The filter element may be coated at least in parts with sorbent material or may be made at least in parts of sorbent material. For example, the filter element may comprise a large number of axially formed channels, it being possible for the filter element to have a honeycomb structure in cross-section. In particular, inner walls of the channels may be coated at least in parts with sorbent material.

In particular, an insert that comprises a fluid-tight outer wall that extends all the way around in the circumferential direction may be arranged in the vessel. Furthermore, the outer wall of the insert may be arranged in the first annular space and an outer annular space may be formed between a radial inner surface of the outer shell of the vessel and a radial outer surface of the outer wall of the insert. The outer annular space may be radially outwardly spaced apart from the first annular space and fluidically connected to the first annular space via an outer annular gap that extends all the way around in the circumferential direction. In this way, the evaporation emissions can be guided around inside the vessel prior to being guided through the sorbent material and thus mixed thoroughly in order to increase the sorption rate of, for example, hydrocarbons contained in the evaporation emissions by means of the sorbent material.

The insert may comprise a fluid-tight insert base on the axial end portion thereof facing the first opening of the vessel, it being possible for the outer wall of the insert to be formed on said insert base so as to protrude therefrom in the axial direction. Furthermore, the insert may be designed to be open on the axial end portion thereof facing the second opening of the vessel. By virtue of this configuration, the evaporation emissions can be more easily guided around inside the vessel and thus mixed more thoroughly.

In particular, the central space may be radially outwardly delimited by a fluid-tight inner shell of the vessel that extends all the way around in the circumferential direction, it being possible for the inner shell to be radially inwardly spaced apart from the second slotted wall. Furthermore, an inner annular space may be formed between a radial inner surface of the second slotted wall and a radial outer surface of the inner shell.

Alternatively, the central space may be radially outwardly delimited by a fluid-tight inner shell of the vessel that extends all the way around in the circumferential direction, it being possible for the inner shell to be radially inwardly spaced apart from the middle annular space, in particular the radial inner boundary of the middle annular space. Moreover, an inner annular space may be formed between the radial inner boundary of the middle annular space and a radial outer surface of the inner shell.

This configuration may further help to guide the evaporation emissions around more easily inside the vessel and thus mix same more thoroughly.

The central space may be designed to be open on the axial end portion thereof facing the second opening of the vessel. Furthermore, the central space may be delimited on the axial end portion thereof facing the first opening of the vessel by a slotted inner shell base of the inner shell. By virtue of this configuration, too, the evaporation emissions can be more easily guided around inside the vessel and thus mixed more thoroughly.

In particular, the insert may comprise a fluid-tight inner wall that extends all the way around in the circumferential direction and that is radially inwardly spaced apart from the outer wall of said insert. Furthermore, the inner wall of the insert may be arranged in the inner annular space and a third annular space may be formed between the radial inner surface of the second slotted wall and a radial outer surface of the inner wall of the insert. Alternatively, the third annular space may be formed between the radial inner boundary of the middle annular space and a radial outer surface of the inner wall of the insert. Moreover, the third annular space may be radially outwardly spaced apart from the inner annular space and fluidically connected to the inner annular space via an inner annular gap that extends all the way around in the circumferential direction. This configuration is also suitable for guiding the evaporation emissions around more easily inside the vessel and thus mixing same more thoroughly.

The central space and the annular spaces may be formed concentrically to one another. This configuration may promote a uniform distribution of the sorbent material and the evaporation emissions inside the vessel.

The inner wall of the insert may be formed on the insert base so as to protrude therefrom in the axial direction. In particular, the insert may be formed in one piece by means of the inner wall and/or the above-mentioned outer wall of the insert, which is also formed on the insert base so as to protrude therefrom in the axial direction. As a result, the manufacture of the insert and/or the handling thereof, in particular when installing the insert in the vessel, can be simplified.

In particular, the first slotted wall, the second slotted wall and the inner shell, by means of the relevant axial end portion thereof facing the second opening of the vessel, may be formed, in particular integrally, on a fluid-tight vessel lid of the vessel so as to protrude therefrom in the axial direction. The first slotted wall and the second slotted wall may each comprise a free end on the relevant axial end portion thereof facing the first opening of the vessel. As a result, the manufacture of the vessel lid with the slotted walls and the inner shell, and/or the handling thereof, in particular when installing the vessel lid in the vessel, can be simplified.

The free ends of first slotted wall and the second slotted wall may touch the insert in the region of the insert base. By virtue of this configuration, the second annular space can be separated from the rest of the vessel by means of the slotted walls and the, in particular granular, sorbent material can be held in the second annular space. Of course, the slots in the slotted walls are dimensioned such that the sorbent material designed as granular material cannot pass through the slots. For example, a distance between the slots may be less than a grain size of the granular material.

As an alternative or in addition to the above-described slots in the first slotted wall and second slotted wall, the walls of the second annular space may comprise holes or comprise a sieve mesh or a nonwoven fabric at least in parts.

In particular, if the sorbent material also referred to as sorbent or sorption medium is designed as a self-supporting molded body, for example approximately hollow-cylindrical, it is possible to dispense with the slotted walls of the second annular space.

In this case, the self-supporting molded body can be arranged in the middle annular space, the middle annular space being formed between the inner annular space and the outer annular space, viewed in the radial direction. The self-supporting molded body may be arranged and/or releasably fastened centrally in the middle annular space, in particular by means of a centering means.

Another aspect relates to a sorption system for at least partially filtering evaporation emissions from a fuel tank, comprising a sorption device according to any one of the preceding claims, a pre-vessel for at least partially filtering evaporation emissions from a fuel tank being arranged upstream and/or downstream of the sorption device.

The advantages of the sorption system are analogous to the features and advantages of the sorption device mentioned above.

In the following, exemplary embodiments of the sorption device according to the invention will be explained in greater detail based on the drawings. Of course, the present invention is not restricted to the exemplary embodiments described in the following, and individual features thereof can be combined with other exemplary embodiments.

BRIEF DESCRIPTION OF THE DRAWINGS

In the figures.

DETAILED DESCRIPTION

The axial direction Ax, the circumferential direction Urn and the radial direction Ra are represented in the figures by means of direction arrows, in particular in the manner of a coordinate system. Although the direction arrows each indicate only one direction, a relevant counter-direction is included in the direction shown. By way of example, two radial directions Ra are shown in each figure; this is merely intended to provide an idea of the many possible radial directions Ra.

Figure 1:
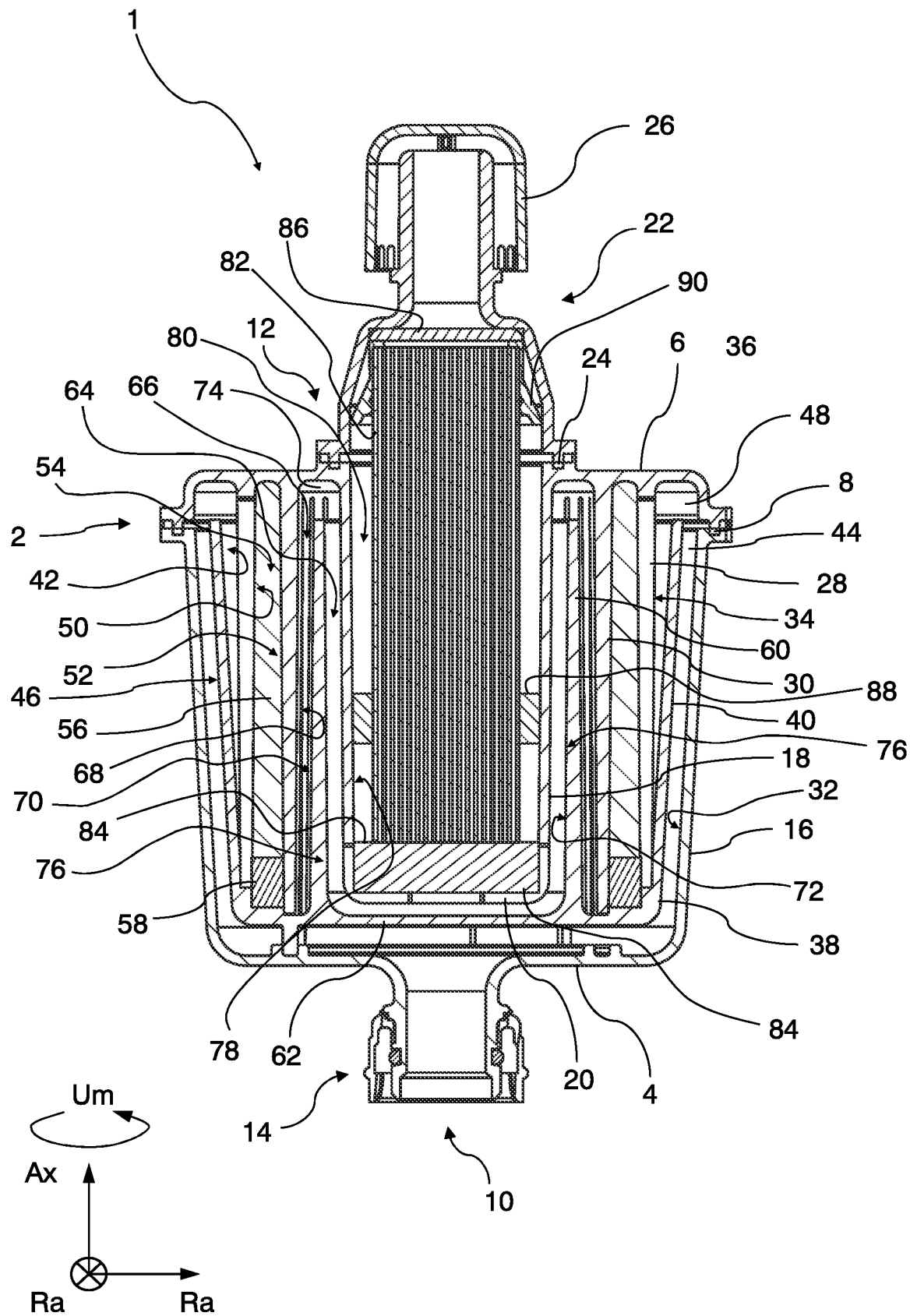
FIG. 1 is a sectional front view of a sorption device according to one exemplary embodiment of the invention.

FIG. 1 is a sectional front view of a sorption device 1 according to an exemplary embodiment of the invention.

The sorption device 1 comprises a vessel 2, which may for example be hollow-cylindrical, and a fluid-tight vessel base 4 and a fluid-tight vessel lid 6. In particular, the vessel base 4 may be connected to the vessel lid 6 in a fluid-tight manner, for example by means of a vessel lid seal 8. A first opening 10 is formed on the vessel base 4 and a second opening 12 is formed on the vessel lid 6, it being possible for fluid to enter the vessel 2 via the first opening 10 and for fluid to exit the vessel 2 via the second opening 12.

The first opening 10 may be connected to an air removal path (not shown) of a fuel tank (not shown), in particular by means of a quick coupling 14 that is formed on the first opening 10 and that may be designed as an engaging means, as shown in the exemplary embodiment.

Furthermore, the vessel 2 comprises a fluid-tight outer shell 16 and a fluid-tight inner shell 18, it being possible for an inner shell base 20 of the inner shell 18 to be slotted, as shown in the exemplary embodiment. The first opening 10 may be arranged on the outer shell 16 and the second opening may be arranged on the inner shell 18, it being possible for the second opening 12 to be connected to the atmosphere, as shown in the exemplary embodiment. Alternatively, the second opening 12 may be connected to another sorption device 1.

As also shown in the exemplary embodiment, the second opening 12 may be provided with a removable cover 22 in order to prevent liquid and/or solid foreign matter from entering the vessel 2. The cover 22 may for example be connected to the vessel lid 6 in a fluid-tight manner by means of a cover seal 24. Furthermore, the cover 22 may for example be designed having a removable dust cap 26, which covers an outlet of the cover 22 to the atmosphere but which allows for a fluid connection between the second opening 12 and the atmosphere.

A first slotted wall 28 that extends all the way around in the circumferential direction Urn and a second slotted wall 30 that extends all the way around in the circumferential direction Urn are arranged in the vessel 2, the second slotted wall 30 being radially Ra inwardly spaced apart from the first slotted wall 28. A first annular space 36 is formed between a radial inner surface 32 of the outer shell 16 of the vessel 2 and a radial outer surface 34 of the first slotted wall 28. In FIG. 1, the section extends through a slot of the first slotted wall 28, i.e. more or less in front of a web of the first slotted wall 28, and through the second slotted wall 30, i.e. more or less through a web of the second slotted wall 30.

As shown in the exemplary embodiment, an insert 38 that comprises a fluid-tight outer wall 40 that extends all the way around in the circumferential direction may be arranged in the vessel 2. The outer wall 40 of the insert 38 may be arranged in the first annular space 36 and the first annular space 36 may be radially outwardly delimited by a radial inner surface 42 of the outer wall 40 of the insert 38. Furthermore, an outer annular space 44 may be formed between the radial inner surface 32 of the outer shell 16 of the vessel 2 and a radial outer surface 46 of the outer wall 40 of the insert 38. The outer annular space 44 may be radially outwardly spaced apart from the first annular space 36 and fluidically connected to the first annular space 36 via an outer annular gap 48 that extends all the way around in the circumferential direction Urn.

A second annular space 54 is formed between a radial inner surface 50 of the first slotted wall 28 and a radial outer surface 52 of the second slotted wall 30, a sorbent material being arranged in the second annular space 54. In the exemplary embodiment shown, the sorbent material is designed as a granular material 56, but may alternatively or additionally be designed as a self-supporting molded body or as a coating of at least one surface arranged in the vessel 2. The granular material 56 is axially Ax held in the second annular space 54 by means of a spacer ring 58. The self-supporting molded body may also be axially Ax held, in particular mounted, in the second annular space 54 by means of the spacer ring 58.

In the case of the sorbent material being designed as a molded body, a radial (Ra) outer surface of the molded body may be formed radially (Ra) at approximately the same radial (Ra) position as the radial (Ra) outer surface (34) of the first slotted wall (28) shown in FIG. 1 or it may be arranged radially further in than the radial (Ra) outer surface (34) of the first slotted wall (28) shown in FIG. 1. In particular, the radial (Ra) outer surface of the molded body may be arranged at the same radial (Ra) position as the radial (Ra) inner surface (50) of the first slotted wall (28) shown in FIG. 1.

Moreover, in the case of the sorbent material being designed as a molded body, the radial (Ra) inner surface of the molded body may be arranged at the same radial position as the inner surface (68) of the second slotted wall (30) shown in FIG. 1 or it may be arranged radially further out than the inner surface (68) of the second slotted wall (30) shown in FIG. 1. In particular, the radial (Ra) inner surface of the molded body may be arranged at the same radial (Ra) position as the radial (Ra) outer surface (52) of the second slotted wall (30) shown in FIG. 1.

The insert 38 arranged in the vessel 2 in the exemplary embodiment shown comprises a fluid-tight inner wall 60 that extends all the way around in the circumferential direction Urn and that is radially Ra inwardly spaced apart from the outer wall 40 of the insert. Furthermore, the insert 38 comprises, on the axial end portion thereof facing the first opening 10 of the vessel 2, a fluid-tight insert base 62, on which the outer wall 40 and the inner wall 60 of the insert 38 are formed so as to protrude from the insert base 62 in the axial direction Ax and so as to be integral with the insert base 62. The insert is designed to be open on the axial Ax end portion thereof facing the second opening 12 of the vessel 2.

As shown in the exemplary embodiment, the inner wall 60 of the insert 38 may be arranged in the inner annular space 64 and a third annular space 66 may be formed between a radial inner surface 68 of the second slotted wall 30 and a radial outer surface 70 of the inner wall 60 of the insert 38. The inner annular space 64 may be radially Ra outwardly delimited by a radial inner surface 72 of the inner wall 60. The third annular space 66 may be radially Ra outwardly spaced apart from the inner annular space 64 and fluidically connected to the inner annular space 64 via an inner annular gap 74 that extends all the way around in the circumferential direction Urn.

As also shown in the exemplary embodiment, the first slotted wall 28, the second slotted wall 30 and the inner shell 18, by means of the relevant axial end portion thereof facing the second opening 12 of the vessel 2, may be formed integrally on the fluid-tight vessel lid 6 of the vessel 2 so as to protrude therefrom in the axial direction Ax. The first slotted wall 28 and the second slotted wall 30 may each comprise a free end on the relevant axial end portion thereof facing the first opening 10 of the vessel 2. The free ends of the two slotted walls 28, 30 may touch the insert 38 in the region of the insert base 62.

Furthermore, alternatively or additionally, the sorbent material may be designed as a coating in the vessel 2, for example on the radial inner surface 32 of the outer shell 16 of the vessel 2, the radial outer surface 34 of the first slotted wall 28, the radial inner surface 50 of the first slotted wall 28, the radial outer surface 46 of the outer wall 40 of the insert 38, the radial inner surface 42 of the outer wall 40 of the insert 38, the radial outer surface 52 of the second slotted wall 30, the radial inner surface 68 of the second slotted wall 30, the radial outer surface 70 of the inner wall 60 of the insert 38, the radial inner surface 72 of the insert 38, a radial outer surface 76 of the inner shell 18 and/or a radial inner surface 78 of the inner shell 18. In particular, a surface between the slots of the slotted walls 28, 30 may be coated with the sorbent material.

As an alternative to the slots of the relevant slotted wall 28, 30, which are formed over an entire circumference of the relevant slotted wall 28, 30 and extend over an entire axial Ax length of the relevant slotted wall 28, 30 in the exemplary embodiment shown, the slots may merely be formed on part of the circumference of the relevant slotted wall 28, 30. As another alternative, the slots may merely extend over part of the axial Ax length of the relevant slotted wall 28, 30. For example, the slots may be formed on the axial Ax end portion of the relevant slotted wall 28, 30 in the region of the vessel lid 6, it being possible for no slots to be formed in the region of the free end of the relevant slotted wall 28 30, i.e. the relevant slotted wall 28, 30 may be designed to be fluid-tight in the region of the free end thereof. The slots may also be formed merely on part of the circumference of the relevant slotted wall 28, 30.

A central space 80 is delimited in the circumferential direction Um by the radial inner surface 78 of the inner shell 18 that extends all the way around in the circumferential direction Urn. As shown in the exemplary embodiment, the central space 80 and the annular spaces 36, 44, 64, 66, 54 may be formed concentrically to one another.

A filter element 82 may be arranged in the central space 80, as shown in the exemplary embodiment. The filter element 82 is made of sorbent material, but it may also be coated at least in parts with the sorbent material. The filter element 82 shown comprises a large number of axially Ax formed channels and has a honeycomb structure in cross-section. The channel inner walls may be coated at least in parts with the sorbent material.

The filter element 82 may be mounted axially Ax and radially Ra in the central space 80, for example by means of one or more spacer disks 84, 86 and/or by means of one or more guide rings 88, 90. The relevant spacer disk 84, 86 may be disk-shaped or ring-shaped. In the axial direction Ax, the filter element 82 may be held by the spacer disks 84, 86, it being possible for a first spacer disk 84 to be arranged on the inner shell base 20 and to consist, for example, of a foam material, and therefore to be permeable to fluid. The first spacer disk 84 may be ring-shaped so as to impair the flow of evaporation emissions into the filter element 82 as little as possible.

A second spacer disk 86 may be arranged in the cover 22 and may for example consist of a nonwoven fabric, and may therefore also be permeable to fluid. The second spacer disk 86 may be disk-shaped in order to filter other substances and/or solids out of the evaporation emissions.

In the radial direction Ra, the filter element 82 may be held by the guide rings 88, 90, a first guide ring 88 surrounding the filter element 82 in the circumferential direction Urn at approximately one third of an axial Ax length of the filter element 82. Alternatively or additionally, a first guide ring 88 or at least one additional guide ring (not shown) may surround the filter element 82 at approximately one half and/or approximately two thirds of the axial Ax length of the filter element 82. The first guide ring 88 and/or the at least one additional guide ring may for example also be permeable to fluid.

As shown in the exemplary embodiment, a second guide ring 90 may be arranged on the free end of the filter element 82, on which the cover 22 is arranged. The second guide ring 90, in addition to the guiding property thereof in the radial direction Ra, may also have a sealing property and seal the filter element 82 off from the cover 22. The second guide ring 90 may therefore be designed to be fluid-tight.

The above-described insert 38 present in the exemplary embodiment shown may be omitted. In this case, a path of the evaporation emissions from the fuel tank through the sorption device 1 proceeds as follows:

The evaporation emissions from the fuel tank enter the vessel 2 through the first opening 10 into the first annular space 36. From there, they pass through the first slotted wall 28 into the second annular space 54, where they flow through the granular material 56 consisting of sorbent material, and thus hydrocarbons, for example, are filtered out of the evaporation emissions. The evaporation emissions pass from the granular material 56 through the second slotted wall 30 and via the inner annular space 64 and the slotted inner shell base 20 into the central space 80 of the vessel 2. If the filter element 82 is arranged in the central space 80, the evaporation emissions flow along and/or through said filter element. They then exit the vessel 2 directly into the atmosphere through the second opening 12 and thus exit the sorption device 1. As alternative to the exemplary embodiment shown, the evaporation emissions may be guided from the second opening 12 into another sorption device (not shown).

If the insert 38 is arranged in the vessel 2 of the sorption device 1, a path of the evaporation emissions from the fuel tank through the sorption device 1 proceeds as follows:

The evaporation emissions from the fuel tank enter the vessel 2 through the first opening 10 into the outer annular space 44. From there, they enter the first annular space 36 via the outer annular gap 48 and pass through the first slotted wall 28 into the second annular space 54, where they flow through the granular material 56 consisting of sorbent material, and thus hydrocarbons, for example, are filtered out of the evaporation emissions. The evaporation emissions pass from the granular material 56 through the second slotted wall 30 and into the third annular space 66. From there, they flow into the inner annular space 64 via the inner annular gap 74 and into the central space 80 of the vessel 2 via the slotted inner shell base 20. If the filter element 82 is arranged in the central space 80, the evaporation emissions flow along and/or through said filter element. They then exit the vessel 2 directly into the atmosphere through the second opening 12 and thus exit the sorption device 1. As alternative to the exemplary embodiment shown, the evaporation emissions may be guided from the second opening 12 into another sorption device (not shown).

On their way through the sorption device 1, in particular through the vessel 2, comprising the insert 38 arranged therein, the evaporation emissions are guided around more often and thus mixed more thoroughly. This prevents areas in the evaporation emissions having a higher concentration of hydrocarbons, for example, which could otherwise only be sorbed in part.

When cleaning the sorbent material, in particular the molded body, granular material 56 and/or filter element 82, of caked-on substances, a fluid stream, for example an air stream, can be directed from the second opening 12 of the vessel 2 to the first opening 10 of the vessel 2.

Figure 2:
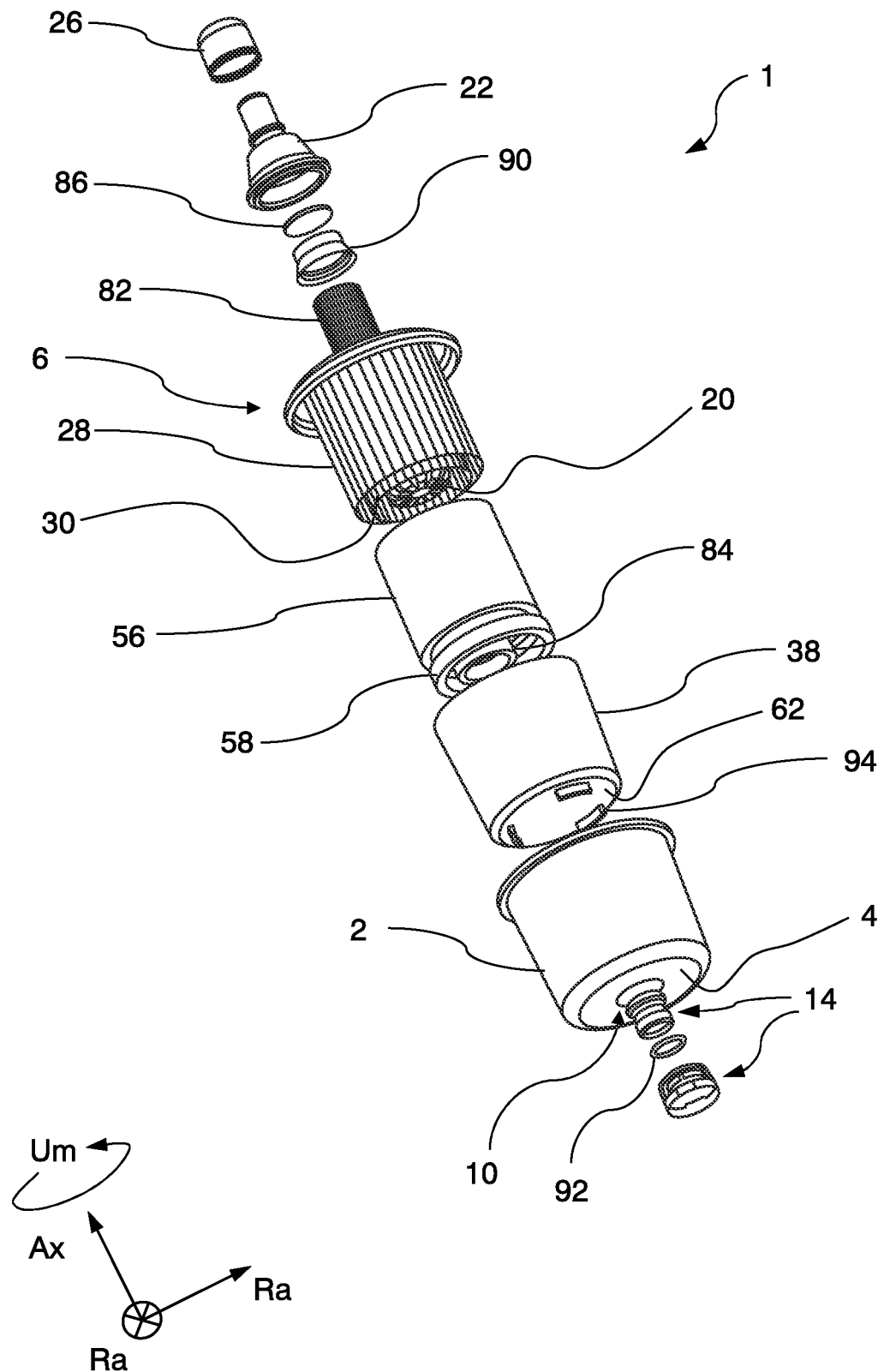
FIG. 2 is an exploded view of the sorption device according to FIG. 1.

In the exploded view of the sorption device 1 according to FIG. 1 shown in FIG. 2, the individual parts of the sorption device 1 are shown approximately as they would be arranged in the sorption device 1 in the axial direction Ax.

The first opening 10 of the vessel 2 having the quick coupling 14 and a sealing disk 92 is shown on one axial Ax end portion of the sorption device 1, it being possible to couple the sorption device 1 to an air removal path (not shown) of a fuel tank. The vessel 2 and the insert 38 then follow in the direction of the other axial Ax end portion of the sorption device 1. One Or more feet 94 may be formed on the insert base 62 in order to space the insert base 62 apart from the vessel base 4 when inserted.

The spacer ring 58 is shown further along in the same direction, by means of which the granular material 56 consisting of sorbent material is held axially Ax in the second annular space 54. The first spacer disk 84 is shown inside the spacer ring 58, which spacer disk is ring-shaped in the exemplary embodiment shown and which supports the filter element 82 on the inner shell base 20 in the axial direction Ax and in the inner shell 18 (not visible here) in the radial direction Ra.

The granular material 56 is then shown in simplified form, after which the vessel lid 6 having the slotted walls 28, 30 formed thereon and having the inner shell 18 comprising the slotted inner shell base 20 is shown. The second opening 12 of the vessel 2 is not visible in this figure due to the perspective view.

Subsequently, the filter element 82 is shown, the first guide ring 88 not being shown in this case.

Then come the second guide ring 90 and the second spacer ring 86, and finally the cover 22 and the dust cap 26.

LIST OF REFERENCE SIGNS

1 Sorption device
2 Vessel
4 Vessel base
6 Vessel lid
8 Vessel lid seal
10 First opening
12 Second opening
14 Quick coupling
16 Outer shell of the vessel
18 Inner shell of the vessel
20 Inner shell base
22 Cover
24 Cover seal
26 Dust cap
28 First slotted wall
30 Second slotted wall
32 Radial inner surface of the outer shell
34 Radial outer surface of the first slotted wall
36 First annular space
38 Insert
40 Outer wall of the insert
42 Radial inner surface of the outer wall
44 Outer annular space
46 Radial outer surface of the outer wall
48 Outer annular gap
50 Radial inner surface of the first slotted wall
52 Radial outer surface of the second slotted wall
53 Second annular space
56 Granular material consisting of sorbent material
58 Spacer ring
60 Inner wall of the insert
62 Insert base
64 Inner annular space
66 Third annular space
68 Radial inner surface of the second slotted wall
70 Radial outer surface of the inner wall
72 Radial inner surface of the inner wall
74 Inner annular gap
76 Radial outer surface of the inner shell
78 Radial inner surface of the inner shell
80 Central space
82 Filter element
84 First spacer disk
86 Second spacer disk
88 First guide ring
90 Second guide ring
92 Sealing disk
94 Feet of the insert
A-A Transverse plane
B-B Longitudinal plane
Ax Axial direction
Ra Radial direction
Um Circumferential direction

The invention claimed is:

1. A sorption device for filtering evaporation emissions from a fuel tank, comprising:
a vessel for at least partially filtering evaporation emissions from the fuel tank, the vessel including:
a first opening adapted to be connected to an air removal path of the fuel tank,
a second opening which is adapted to open out into the atmosphere or into another sorption device,
a middle annular space arranged between a radial outer boundary of the middle annular space that extends all the way around in a circumferential direction and a radial inner boundary that extends all the way around in the circumferential direction and that is radially inwardly spaced apart from said outer boundary, a fluid-tight outer shell, which outer shell extends all the way around in the circumferential direction, a first annular space formed between a radial inner surface of the fluid-tight outer shell, and the radial outer boundary of the middle annular space that is radially inwardly spaced apart therefrom, and a sorbent material arranged in the middle annular space, wherein evaporation emissions from the fuel tank are guided through the first opening into the first annular space, through the sorbent material into a central space of the vessel in the radial direction, and through the second opening and one of:
directly or indirectly into the atmosphere or into another sorption device, wherein the radial outer boundary of the middle annular space is a radial outer surface of the sorbent material designed as a molded body, and wherein the radial inner boundary of the middle annular space is a radial inner surface of the sorbent material designed as the molded body.

2. The sorption device according to claim 1,
further comprising a filter element comprising an additional sorbent material arranged in the central space, and
wherein the evaporation emissions from the fuel tank are guided along and/or through the filter element to the second opening of the vessel.

3. The sorption device according to claim 2, wherein the filter element is one of:
coated at least in parts with the additional sorbent material or made at least in parts of the additional sorbent material.

4. A sorption device for filtering evaporation emissions from a fuel tank, comprising:
a vessel for at least partially filtering evaporation emissions from the fuel tank, the vessel including:
a first opening adapted to be connected to an air removal path of the fuel tank,
a second opening which is adapted to open out into the atmosphere or into another sorption device,
a middle annular space arranged between a radial outer boundary of the middle annular space that extends all the way around in a circumferential direction and a radial inner boundary that extends all the way around in the circumferential direction and that is radially inwardly spaced apart from said outer boundary,
a fluid-tight outer shell, which outer shell extends all the way around in the circumferential direction,
a first annular space formed between a radial inner surface of the fluid-tight outer shell, and the radial outer boundary of the middle annular space that is radially inwardly spaced apart therefrom, and
a sorbent material arranged in the middle annular space,
wherein evaporation emissions from the fuel tank are guided through the first opening into the first annular space, through the sorbent material into a central space of the vessel in the radial direction, and through the second opening and one of:
directly or indirectly into the atmosphere or into another sorption device,
wherein the radial outer boundary of the middle annular space is a radial outer surface of a first slotted wall that extends all the way around in the circumferential direction, wherein the radial inner boundary of the middle annular space is a radial inner surface of a second slotted wall that extends all the way around in the circumferential direction, and wherein the second slotted wall is radially inwardly spaced apart from the first slotted wall.

5. The sorption device according to claim 4,
wherein a second annular space is formed between a radial inner surface of the first slotted wall and a radial outer surface of the second slotted wall, and
wherein the sorbent material is one of:
a granular material,
a molded body, or
a combination of a granular material and molded body, and
wherein the sorbent material is at least one of:
provided in the second annular space,
a coating at least of the radial inner surface of the first slotted wall or
a coating at least of the radial outer surface of the second slotted wall.

6. The sorption device according to claim 4,
wherein the vessel further includes a fluid-tight inner shell that extends all the way around in the circumferential direction,
wherein the central space is radially outwardly delimited by the fluid-tight inner shell,
wherein the inner shell is radially inwardly spaced apart from one of:
the middle annular space or
the second slotted wall, and
wherein an inner annular space is formed between one of:
the radial inner boundary of the middle annular space or
a radial inner surface of the second slotted wall, and a radial outer surface of the inner shell.

7. The sorption device according to claim 6,
wherein the central space is open on an axial end portion thereof facing the second opening of the vessel, and
wherein the central space is delimited on the axial end portion thereof facing the first opening of the vessel by a slotted inner shell base of the inner shell.

8. The sorption device according to claim 6,
further comprising an insert that comprises a fluid-tight outer wall that extends all the way around in the circumferential direction arranged in the vessel,
wherein the insert comprises a fluid-tight inner wall that extends all the way around in the circumferential direction and that is radially inwardly spaced apart from the outer wall of said insert,
wherein the inner wall of the insert is arranged in the inner annular space,
wherein a third annular space is formed between one of:
the radial inner boundary of the middle annular space or
the radial inner surface of the second slotted wall, and a radial outer surface of the inner wall of the insert, and
wherein the third annular space is radially outwardly spaced apart from the inner annular space and fluidly connected to the inner annular space via an inner annular gap that extends all the way around in the circumferential direction.

9. The sorption device according to claim 8,
wherein the insert comprises a fluid-tight insert base on an axial end portion thereof facing the first opening of the vessel, and wherein the inner wall of the insert is formed on the insert base so as to protrude therefrom in the axial direction.

10. The sorption device according to claim 6, further comprising a fluid-tight vessel lid of the vessel, and
wherein the first slotted wall, the second slotted wall and the inner shell, by way of respective axial end portions thereof facing the second opening of the vessel, are formed on the fluid-tight vessel lid of the vessel so as to protrude therefrom in the axial direction, and
wherein the first slotted wall and the second slotted wall each comprise a free end on their respective axial end portions thereof facing the first opening of the vessel.

11. The sorption device according to claim 9, wherein respective free ends of the first slotted wall and the second slotted wall touch the insert in the region of the insert base.

12. The sorption device according to claim 4, wherein the sorbent material is one of:
   a granular material,
   a molded body, or
   a combination of a granular material and a molded body.

13. The sorption device according to claim 4, further comprising a filter element comprising an additional sorbent material arranged in the central space, and
wherein the evaporation emissions from the fuel tank are guided along and/or through the filter element to the second opening of the vessel.

14. The sorption device according to claim 13, wherein the filter element is one of:
   coated at least in parts with the additional sorbent material or made at least in parts of the additional sorbent material.

15. A sorption device for filtering evaporation emissions from a fuel tank, comprising:
   a vessel for at least partially filtering evaporation emissions from the fuel tank, the vessel including:
      a first opening adapted to be connected to an air removal path of the fuel tank,
      a second opening which is adapted to open out into the atmosphere or into another sorption device,
      a middle annular space arranged between a radial outer boundary of the middle annular space that extends all the way around in a circumferential direction and a radial inner boundary that extends all the way around in the circumferential direction and that is radially inwardly spaced apart from said outer boundary,
      a fluid-tight outer shell, which outer shell extends all the way around in the circumferential direction,
      a first annular space formed between a radial inner surface of the fluid-tight outer shell, and the radial outer boundary of the middle annular space that is radially inwardly spaced apart therefrom, and
      a sorbent material arranged in the middle annular space,
      wherein evaporation emissions from the fuel tank are guided through the first opening into the first annular space, through the sorbent material into a central space of the vessel in the radial direction, and through the second opening and one of:
      directly or indirectly into the atmosphere or into another sorption device,
   an insert that comprises a fluid-tight outer wall that extends all the way around in the circumferential direction arranged in the vessel,
   wherein the outer wall of the insert is arranged in the first annular space and an outer annular space is formed between a radial inner surface of the outer shell of the vessel and a radial outer surface of the outer wall of the insert, and
   wherein the outer annular space is radially outwardly spaced apart from the first annular space and fluidly connected to the first annular space via an outer annular gap that extends all the way around in the circumferential direction.

16. The sorption device according to claim 15, wherein the insert comprises a fluid-tight insert base on an axial end portion thereof facing the first opening of the vessel, on which insert base the outer wall of the insert is formed so as to protrude therefrom in the axial direction, and
wherein the insert is designed to be open on an axial end portion thereof facing the second opening of the vessel.

17. The sorption device according to claim 15, wherein the sorbent material is one of:
   a granular material,
   a molded body, or
   a combination of a granular material and a molded body.

18. The sorption device according to claim 17, further comprising a filter element comprising an additional sorbent material arranged in the central space, and
wherein the evaporation emissions from the fuel tank are guided along and/or through the filter element to the second opening of the vessel.

19. The sorption device according to claim 18, wherein the filter element is one of:
   coated at least in parts with the additional sorbent material or made at least in parts of the additional sorbent material.

20. A sorption system for at least partially filtering evaporation emissions from a fuel tank, comprising a sorption device comprising:
   a vessel for at least partially filtering evaporation emissions from the fuel tank, the vessel including:
      a first opening adapted to be connected to an air removal path of the fuel tank,
      a second opening which is adapted to open out into the atmosphere or into another sorption device,
      a middle annular space arranged between a radial outer boundary of the middle annular space that extends all the way around in a circumferential direction and a radial inner boundary that extends all the way around in the circumferential direction and that is radially inwardly spaced apart from said outer boundary,
      a fluid-tight outer shell, which outer shell extends all the way around in the circumferential direction,
      a first annular space formed between a radial inner surface of the fluid-tight outer shell, and the radial outer boundary of the middle annular space that is radially inwardly spaced apart therefrom, and
      a sorbent material arranged in the middle annular space,
      wherein evaporation emissions from the fuel tank are guided through the first opening into the first annular space, through the sorbent material into a central space of the vessel in the radial direction, and through the second opening and one of:
      directly or indirectly into the atmosphere or into another sorption device, and
   a pre-vessel for at least partially filtering evaporation emissions from the fuel tank arranged one of:
      upstream,
      downstream or
      upstream and downstream of the sorption device.

21. The sorption device according to claim 20, wherein the sorbent material is one of:
a granular material,
a molded body, or
a combination of a granular material and a molded body.

* * * * *